(12) United States Patent
Lepoutre

(10) Patent No.: US 6,311,678 B1
(45) Date of Patent: Nov. 6, 2001

(54) INTERNAL COMBUSTION ENGINE INTAKE HEAT EXCHANGER

(75) Inventor: Henri Lepoutre, Roubaix Cedex (FR)

(73) Assignee: Westaflex-Automobile, Roubaix Cedex (FR)

( * ) Notice: Subject to any disclaimer, the term of this patent is extended or adjusted under 35 U.S.C. 154(b) by 0 days.

(21) Appl. No.: 09/553,096

(22) Filed: Apr. 20, 2000

(30) Foreign Application Priority Data

Apr. 29, 1999 (FR) .................................................. 99 05453

(51) Int. Cl.⁷ .................................................. F02B 47/08
(52) U.S. Cl. ..................... 123/568.12; 123/184.61; 123/41.31
(58) Field of Search .................... 123/568.12, 184.61, 123/41.31

(56) References Cited

U.S. PATENT DOCUMENTS

| 3,937,196 | 2/1976 | Cook et al. .................... 123/119 A |
| 4,258,687 | 3/1981 | Mauch et al. .................... 123/570 |
| 4,267,812 | * 5/1981 | Aula et al. .................... 123/570 |
| 4,291,760 | * 9/1981 | Argvle et al. .................... 123/568.12 |
| 4,938,176 | * 7/1990 | Tanaka et al. .................... 123/568.12 |
| 5,732,688 | * 3/1998 | Charlton et al. .................... 123/568.12 |
| 5,970,960 | * 10/1999 | Azuma .................... 123/568.12 |
| 6,213,105 | * 4/2001 | Banzhaf et al. .................... 123/568.12 |

FOREIGN PATENT DOCUMENTS

| 10331724 | 12/1998 | (JP) .................... F02M/25/07 |
| 11013554 | 1/1999 | (JP) .................... F02M/25/07 |

* cited by examiner

Primary Examiner—Erick Solis

(57) ABSTRACT

A thermal exchanger to be implemented in the air intake circuit of an internal combustion engine, notably in an intake splitter which includes a hollow plastic body (1) that defines an air intake chamber (2), an entry (3) for air and one or many exits which communicate with the head of the engine. The thermal exchanger constitutes of a chamber (5), at least part of which is in a plastic material, and which features a first opening towards the outside, a second opening (7) that communicates with the intake chamber (2), a third opening (8) that communicates with a canal (9) which supplies coolant fluid, a fourth opening (10) that communicates with a canal (11) which carries the coolant fluid out, a metallic assembly that forms the hot part of the exchanger.

12 Claims, 5 Drawing Sheets

INTERNAL COMBUSTION ENGINE INTAKE HEAT EXCHANGER

FIELD OF THE INVENTION

The present invention relates to elements of the air intake circuit of an internal combustion engine. The elements are placed so that they may communicate with the engine head to provide the cylinders of the engine with air. The elements are an intake splitter, a filter or a pipe which connects the splitter and the filter. This type of element of the air intake circuit, notably a splitter, generally include a body in a plastic material which defines an air intake chamber that features an entry for air and an exit communicating with the engine head.

The present invention also relates to heat exchangers which will be implemented within the air intake circuit of a combustion engine.

For reasons stemming from environmental protection, it is increasingly wished for exhaust gases to be recycled so that they may be re-introduced in the air intake cycle of the engine's combustion.

In order to re-introduce exhaust gases in the air intake cycle, it is necessary to cool those, firstly for performance reasons, as the performance of a combustion engine increases as the air taken in gets colder. Secondly, exhaust gases which are too hot may not be reintroduced in the elements of the air intake as these elements are in a plastic material which may be damaged by the high temperatures of the exhaust gases.

A heat exchanger, able to cool exhaust gases down to an acceptable temperature for the entry into the element of the air intake, is therefore implemented along the line of derivation of the exhaust gases in the direction of the air intake element.

The fitting of such a solution is complicated as the pipe for the intake of exhaust gases must be connected to both ends of the heat exchanger. The connections are so complicated that on the one hand, the rejection levels during manufacturing are very high (especially in the case of welding) and, on the other hand, the manufacturing costs are also high as both the labour costs (to manufacture the exchanger) and the fitting time (to fit the exchanger) are high.

An element of the intake section for an internal combustion engine according to the invention aims to remedy these limitations, notably an intake splitter. The intake splitter enables the recycling of exhaust gases but is easy to manufacture, both in terms of labour and of costs, as the number of connections to be made on the heat exchanger by welding is reduced. The element of the air intake for an internal combustion engine which is obtained is particularly efficient for the recycling of exhaust gases, without however damaging its integrity, notably in the case of intake splitters in a plastic material which have a tendency to deteriorate due to the fusion of the plastic material when subjected to the high temperature of exhaust gases.

SUMMARY OF THE INVENTION

According to an aspect of the present invention, there is provided an element of the air intake circuit for an internal combustion engine which includes a hollow body, at least part of which is in a plastic material and defines an air intake chamber with an entry for air and one or many exits that communicate with the head of the engine, notably an intake splitter is characterised in that the body, part of which is at least in a plastic material and includes a wall, part of which is at least in a plastic material which defines an auxiliary chamber. The auxiliary chamber features a first opening towards the outside, a second opening that communicates with the intake chamber, a third opening that communicates with a canal which brings in coolant fluid and a fourth opening that communicates with a canal which takes coolant fluid out;

a metallic assembly, which forms the hot part of a heat exchanger to cool exhaust gases which come through the assembly by way of the coolant fluid is implemented in the auxiliary chamber. The exit of the assembly communicates with the second opening of the auxiliary chamber and the auxiliary chamber constitutes the frame of the heat exchanger; and a first and second metallic assembly are implemented so as to divide the auxiliary chamber and therefore divides the frame into a first extremity compartment that communicates with the outside, a central compartment and a second extremity compartment. The central compartment communicates with the third and fourth openings so that the coolant fluid may flow from one to the other without however entering one of the extremity compartments. The first metallic element is implemented between the part of the assembly located in the first extremity compartment and at least part of the wall of the auxiliary chamber.

By implementing a second chamber which forms the frame of the heat exchanger, in regard of the metallic assembly which forms the hot part of a heat exchanger and by implementing metallic parts to protect the plastic material of the element of the air intake (notably an intake splitter) from the spot where the temperature of the exhaust gases in the exchanger is the highest, and therefore most likely to damage the plastic material, an element of the air intake is obtained which is in a plastic material within which a heat exchanger is integrated that allows for recycling of exhaust gases. The complex means of assembling pipes for the recycling of exhaust gases on both sides of the heat exchanger are therefore not required.

According to a preferred application of the invention, a locking mechanism, notably by latching, is implemented to fix the assembly to the element of the air intake circuit in its working position within the auxiliary chamber. A good fixation and a good integration of the heat exchanger to the element of the air intake circuit is therefore ensured.

According to a preferred application of the invention, the second metallic element is also implemented between the assembly which forms the hot section located in the second extremity compartment and the wall of the auxiliary chamber or frame.

A complete separation of the hot part and the plastic material is therefore ensured as a metallic part separates the hot section from the wall in both of the extremity compartments, whereas the coolant fluid itself separates the hot assembly from the wall that forms the auxiliary chamber in the central compartment.

According to a preferred application of the invention, at least part of the first metallic element is located above the third opening of the auxiliary chamber.

The first metallic element is therefore directly in contact with the coldest part of the coolant fluid and is kept at a temperature as cold as possible by conduction over all its surface. This separates thermally the hottest part of the assembly from the wall in a plastic material in an efficient manner.

According to a preferred application of the invention, at least part of the second metallic element is located above the fourth opening of the auxiliary chamber. The second metallic element is therefore kept entirely cold by conduction in the same manner as the first metallic element by the third opening. This enables a good thermal separation between the hot part of the heat exchanger on the exit side and the wall that defines the auxiliary chamber.

According to an implementation of the invention, the auxiliary chamber has a cylindrical shape. The heat exchanger is cylindrical and constitutes a first and a second funnel between which an array of pipes extend. The two metallic elements take the form of a cylindrical bell constituting of two rings implemented side by side, having a different radius from one another and linked to one another by a step or lip. The ring with the smallest radius is located underneath the third opening, whereas the ring with the largest radius adjusts tightly to the cylindrically-circular wall of the auxiliary chamber.

According to a preferred application of the invention, a waterproof seal, notably a circular seal in the case of a cylindrical heat exchanger, is implemented between the first metallic element and the wall.

Similarly, according to a second aspect of the preferred invention, a waterproof seal is also implemented between the second metallic element and the wall of the auxiliary chamber.

According to a further preferred application of the invention, the exit of the hot part of the heat exchanger constitutes of a bent pipe, the distal extremity of which coincides with the second opening of the auxiliary chamber.

The invention also relates to a heat exchanger that will be implemented in the air intake circuit of an internal combustion engine, notably in an intake splitter including a hollow body in a plastic material which defines an air intake chamber, an entry for air and one or many exits communicating with the head of the engine, wherein: a chamber, at least part of which is in a plastic material with a first opening towards the outside, a second opening that communicates with the intake chamber, a third opening that communicates with a canal which brings in coolant fluid and a fourth opening that communicates with a canal which takes coolant fluid out; a metallic assembly which forms the hot part of a heat exchanger to cool exhaust gases which come through the assembly by way of the coolant fluid located in the chamber. The exit of the assembly communicates with the second opening of the chamber and the chamber constitutes the frame of the heat exchanger; and a first and a second metallic assembly implemented so as to divide the auxiliary chamber, and so divide the frame into a first extremity compartment that communicates with the outside, a central compartment and a second extremity compartment. The central compartment communicates with the third and fourth openings so that the coolant fluid may flow from one to the other without however coming into one of the extremity compartments. The first metallic element is implemented between the part of the assembly located in the first extremity compartment and at least part of the wall of the auxiliary chamber.

BRIEF DESCRIPTION OF THE DRAWINGS

Preferred methods of implementing the invention will now be described with reference only to the following drawings, in which.

DETAILED DESCRIPTION OF THE PREFERRED EMBODIMENTS

Figure 1:
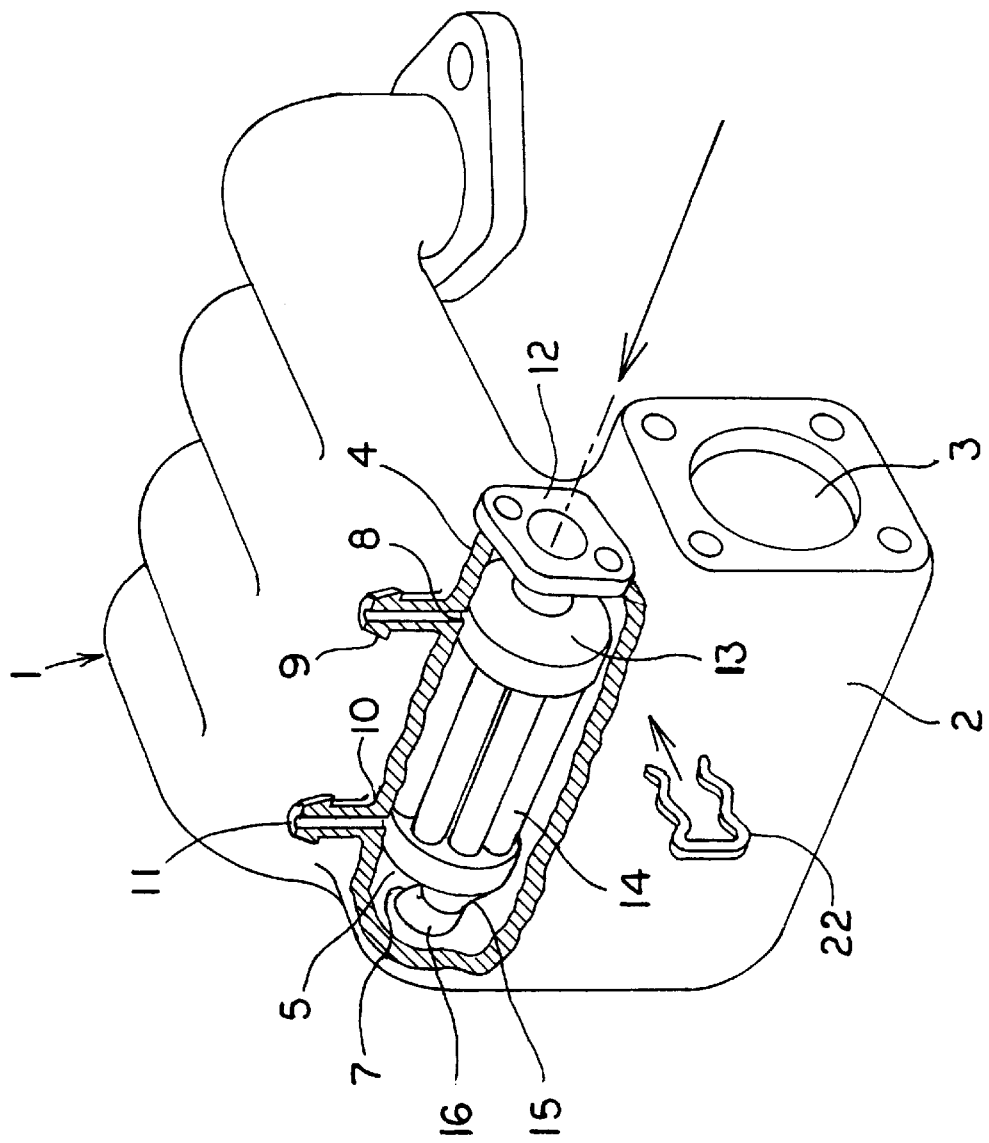
FIG. 1 is a view in perspective of an intake splitter according to the invention, a part of which is shown open in order to better observe how the heat exchanger is positioned within the intake splitter.

FIG. 1 shows an intake splitter which will be implemented so that it communicates with the head of an engine and feeds the air taken in for the combustion cycle of the engine. This intake splitter illustrated in FIG. 1 constitutes a hollow body 1, which defines an intake chamber 2. The chamber 2, formed within the body 1, includes an opening 3 that communicates with an air admission box, through which enters fresh incoming air. The chamber 2 also includes four openings, each of which communicates with the head of the engine and through which the air taken in, exits after it has been split in the intake splitter. The hollow body 1 features four pipes, placed next to one another near the four openings (which are not featured in the Figure as they are hidden by the perspective), which enable a repartition of the air taken in that enters through opening 3.

Inside the hollow body 1, a wall 4 is implemented so that it forms an auxiliary chamber 5 which is distinct from the air intake chamber 2 and inside the hollow body 1. In FIG. 1, part of the wall 4 which forms the limit of the auxiliary chamber 6, is shown open so as to facilitate the understanding of the invention. The auxiliary chamber 5 includes a first opening 6 opening towards the outside, a second opening 7 that enables the auxiliary chamber 5 to communicate with the intake chamber 2, a third opening 8 that communicates with a canal 9 which brings in coolant fluid linked to a cooling system, for instance that of the engine. The chamber 5 also includes a fourth opening 10 that communicates with a canal 11 which takes coolant fluid out to the cooling system of the engine. The auxiliary chamber 5 has a cylindrically-circular form. It constitutes the frame (ie the outside envelope) of a heat exchanger. This heat exchanger is implemented to cool down exhaust gases so that they may be recycled in the intake chamber of the air splitter. The exhaust gases will circulate in what is referred to as the hot part of the heat exchanger, whilst being cooled by the coolant fluid that enters through the canal 9 and exits through the canal 11. The cold exhaust gases enter into the intake chamber 1 through the opening 7 and return to the engine after they have been split into the various pipes of the intake splitter.

The hot part of the heat exchanger constitutes an assembly of stainless steel parts which are assembled by strong brazing. They include an entry pipe 12, (any other type of connection can also be considered) for the exhaust gases to enter. This pipe 12 is connected to a funnel 13 which splits the exhaust gases through an array of pipes. The pipes 14 are connected on the other side to another funnel 15, which will group all the exhaust gases back from the pipes 14, to conduct them to the opening 7 by way of a bent tube 16. The coolant fluid circulates around the tube array 14 after it has entered by way of the opening 8, and cools the exhaust gases that circulate inside the tubes. The coolant fluid (which has warmed by this point) then exits by way of the opening 10, through the canal 11 to the cooling system of the engine, so that it may be recycled and returned through the canal 9 of cold coolant fluid supply.

A bell-shaped metallic element 17 surrounds the funnel 13 and is located between the funnel 13 and the wall 4, which is in a plastic material. The wall 4 forms the limit of the auxiliary chamber 5 and therefore also forms the frame of the heat exchanger. The bell 17 constitutes of two circular rings 18 and 19, connected by a circular rim 20, with one of the rings 19 being of a smaller diameter than that of the other circular ring 18. The diameter of the circular ring 18 of the bell 17 is chosen so as to match the diameter of the circular transversal section of the auxiliary chamber 5, so that the connection between the wall 6 of the auxiliary chamber 5 and the bell 17, by way of its circular ring 18 which has a larger diameter, is made waterproof when the hot part of the heat exchanger is introduced in the auxiliary chamber 5. Moreover, the circular ring 19 of the bell 17 is applied to the larger diameter of the funnel 13 in a waterproof fashion. There is no contact between the outside wall 6, which is in a plastic material and the hot part of the heat exchanger notably the funnel 13, over the entire axial (1) length of the circular ring 19. The canal 9 which brings in coolant fluid is located on the flank of this circular ring 19. The ring 19 of the bell 17 is therefore kept at a temperature as cold as possible, and by conduction the bell 17, which is in a metallic material, preferably stainless steel, is kept at a temperature sufficiently low so as not to melt the wall 6 of the auxiliary chamber 6, which is in a plastic material and with which the bell 17 is in contact by way of the circular ring 18 of a larger diameter. The bell 17 is located on the funnel 13 so that the coolant fluid may not escape through the opening 6 of the auxiliary chamber 5. The length (1) of the axial dimension of the circular ring 19 of the bell 17 will be determined by the characteristics of the heat exchanger. A circular shield 23, constitutes a circular ring in stainless steel which forces the water to circulate on the outside diameter of the bell before it penetrates the middle of the exchanger, therefore improving the cooling of the zone where the bell and the plastic material are in contact. An O-ring seal 21 reinforces the waterproof characteristic of the connection between the plastic wall 6 and the metallic bell 17. The same implementation of a bell takes place around the funnel 15 on the side of the cooled exhaust gases. For instance, the temperature of the gases is 480° C. on entry and 400° C. on exit, and the water temperature is 80° C. on entry and 81° C. on exit.

A heat exchanger formed by a frame, which constitutes the wall 6 of the auxiliary chamber 5 and a hot part which has a cylindrical shape, was shown above. However, any other shape can also be implemented, such as a square or rectangular shape, or an oval shape as in the case of heat exchangers using plates instead of an array of tubes.

A clip 22 can be implemented to latch onto the hot part of the heat exchanger and therefore prevent any unintentional de-coupling of the hot part of the heat exchanger.

The interest of the implementation as described is that both the plastic part that forms the intake splitter, which also forms the frame of the heat exchanger, and the metallic or stainless steel part that forms the hot part of the heat exchanger can be separately manufactured. This hot part includes cylindrical pieces or others which are simple to assemble by brazing, and the number of brazing operations to carry out is much reduced compared to currently known and used exchangers, thereby reducing the risk of leaks and repairs during manufacturing.

The use of O-ring seals allow for sliding the entire metallic part in the plastic part following its axis, then locking the entire apparatus very quickly by using a steel rope clip. This operation can take place at the manufacturing site of the plastic part. The fact that both the hot and the cold part are not rigidly assembled allows for the dilatation of the elements due to temperature variations without however damaging the system altogether.

The use of a plastic jack allows for the integration of the external plastic part of the frame in another piece of the engine manufactured in a similar material, in this case the intake splitter. However, other parts of the engine which are also in plastic may be chosen as a plastic frame for the heat exchanger that will cool the exhaust gases before recycling them in the intake chamber. Similarly, an independent plastic material may be manufactured so that it is built in the circuit of the exhaust gases.

Figure 4:
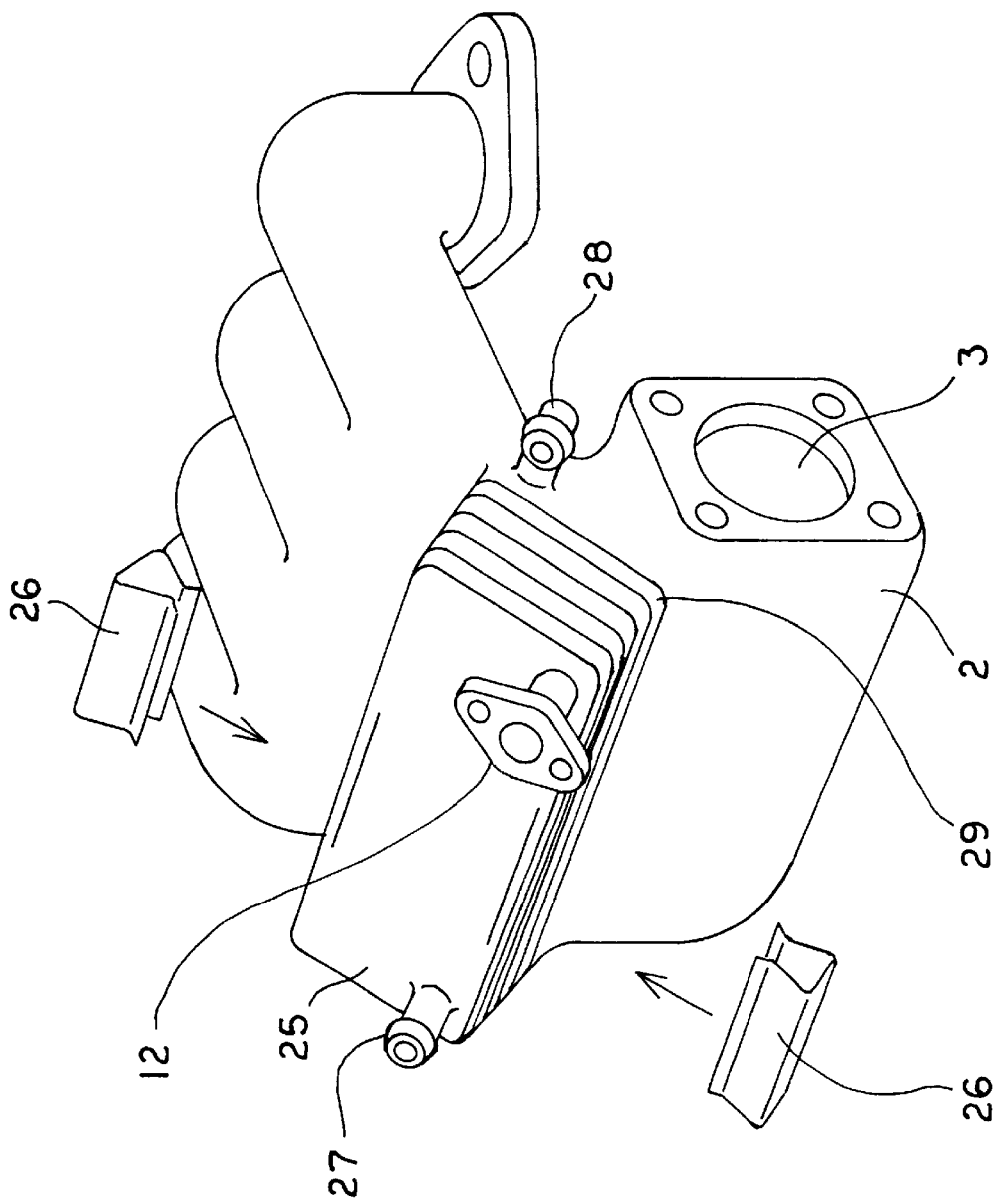
FIG. 4 is another method of implementation of another heat exchanger, which may also be used in an intake splitter according to the invention.

FIG. 4 shows another method of implementation of an intake splitter according to the invention. The elements which are identical or which have an identical function as those featured in the method of implementation in FIG. 1 are designated with the same reference numbers.

The heat exchanger is, in this method of implementation, a heat exchanger with plates.

The exhaust gases come into an auxiliary chamber 25, which is eventually removable and maintained onto the body 1 by way of latching means 26.

Cooling fluid circulates within this auxiliary chamber 25. It enters cold into the chamber via a cooling fluid entry 27 and exits, slightly warmed by its contact with the exhaust gases, via an exit 28.

The exhaust gases enter the chamber 25 by way of a pipe 12, where they circulate in a network of transversal metallic plates which themselves form a closed circuit for the circulation of exhaust gases and are in thermal communication with the cooling fluid so that the exhaust gases are cooled. The transversal plates are placed on top of one another. After they have passed between the transversal plates, the exhaust gases enter the chamber 2 by an opening implemented in the last plate of the thermal exchanger. This last plate constitutes a part 29 of the exterior wall of the plastic body 1 which has a plate shape. As the gases have been sufficiently cooled by the network of metallic plates, the exhaust gases do not damage this part 29 of the exterior wall of the plastic body 1 which has a plate shape. The rest of the wall, which constitutes the chamber 25, is metallic.

With the metallic walls of the chamber 25, the last metallic plate next to the plastic plate 29 therefore forms the metallic elements dividing the auxiliary chamber 25 into a first extremity compartment, a central compartment and a second extremity compartment.

The first extremity compartment constitutes of the space between the last metallic plate and the part 29 of the hollow plastic body 1 which has a plate shape.

The second extremity compartment constitutes of the space between the entry 12 and the first metallic plate of the exchanger with plates. The central compartment constitutes of the space between the first metallic plate and the last, which play the role of the metallic elements.

Figure 5:
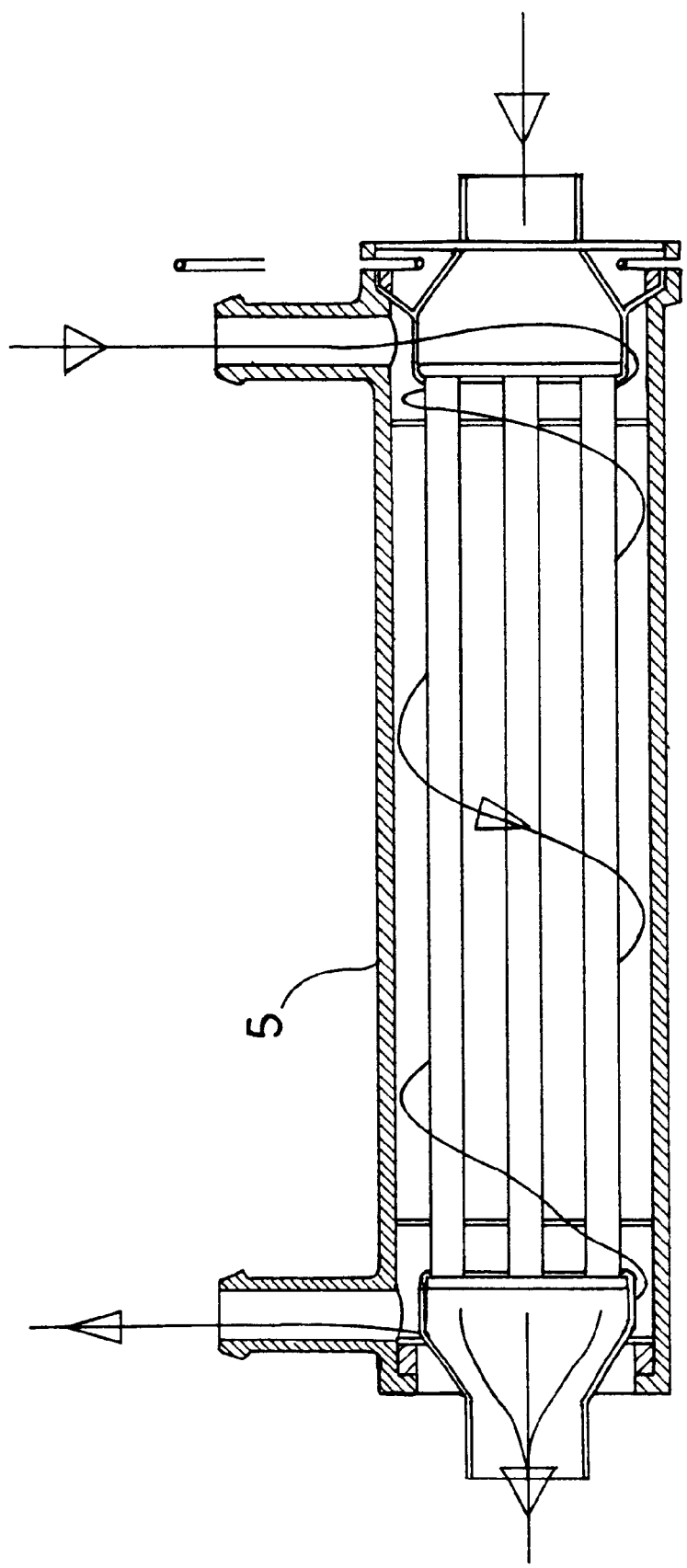
FIG. 5 is a lateral view of a heat exchanger according to the invention.

FIG. 5 is a lateral view of a heat exchanger according to the invention. It is to be implemented in the air intake circuit of an internal combustion engine notably integrated in an element of the intake circuit, as described for the intake splitter in FIGS. 1 to 3 or 4.

Figure 2:
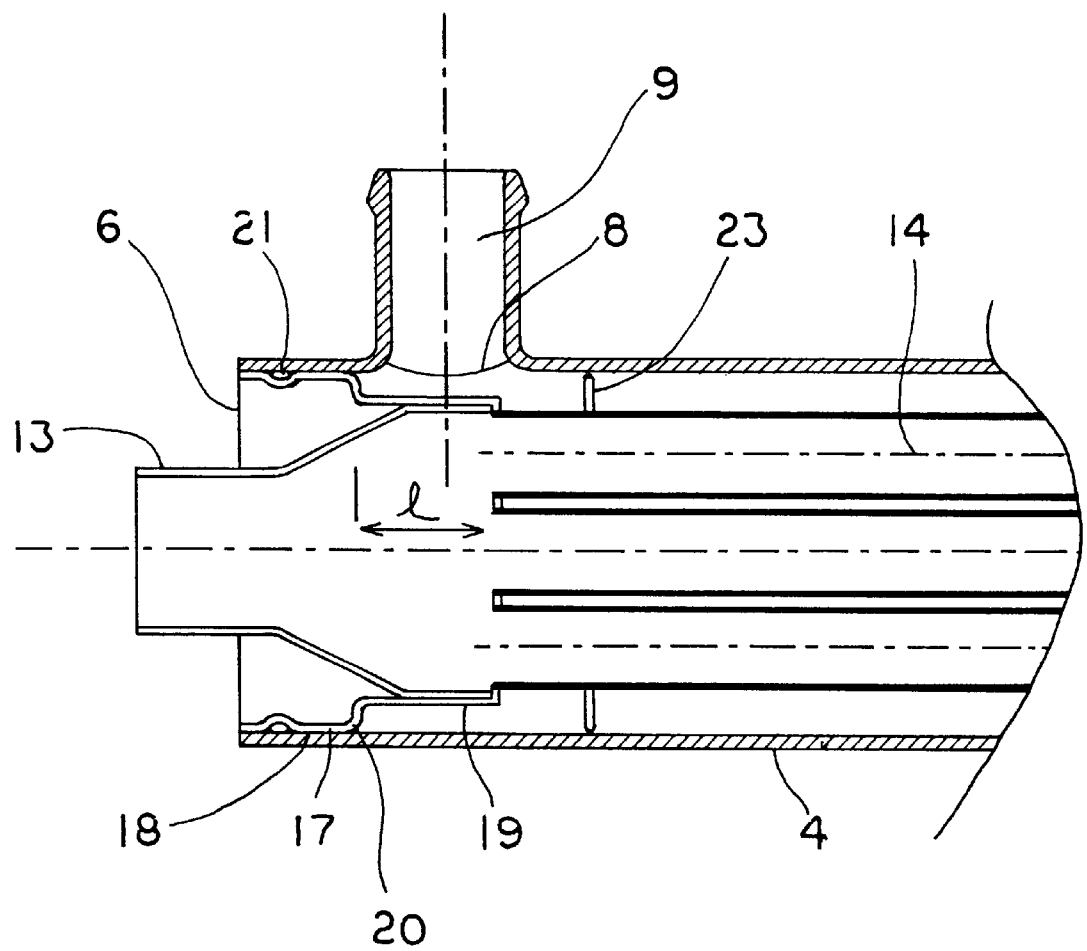
FIG. 2 is a lateral view of a part of the auxiliary chamber (first extremity compartment and part of the central compartment) and the heat exchanger shown in its fitted position.
Figure 3:
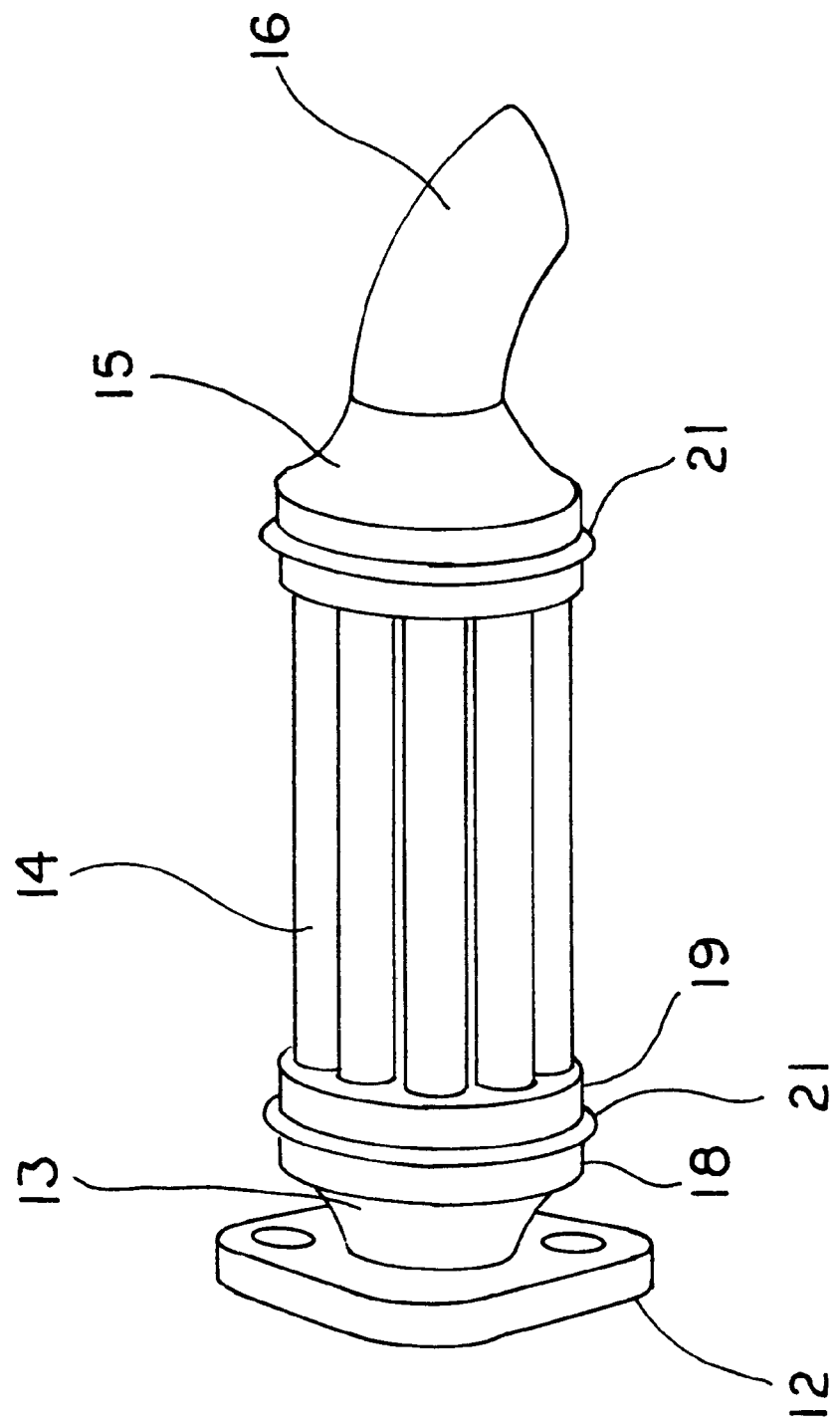
FIG. 3 is a view in perspective of a hot part of a heat exchanger, such as those incorporated in the intake splitters according to the invention.

The heat exchanger constitutes of a frame 5, which has a cylindrical shape. This frame 5 corresponds to the auxiliary chamber 5 of the intake splitter of FIGS. 1 to 3. The remaining parts of the heat exchanger are identical to what is illustrated in FIG. 2. Moreover, the flow of hot gases (in a straight line, going through the tubes) and the flow of cold gases (through canals 9 and 11 and around the tubes) are represented by arrows.

What is claimed is:

1. A heat exchanger for an air intake circuit of an internal combustion engine, including a hollow body in a plastic material which defines an air intake chamber, an entry for air and one or a plurality of exits communicating with the head of the engine, wherein:

an auxiliary chamber, at least part of which is in a plastics material, has a first opening towards the outside, a second opening that communicates with the chamber, a third opening that communicates with a canal that brings in coolant fluid and a fourth opening that communicates with a canal which takes coolant fluid out;

a metallic assembly, which forms the hot part of a heat exchanger to cool exhaust gases which come through the assembly by way of the coolant fluid, located in the chamber, in which the exit of the assembly communicates with the second opening of the chamber and the chamber constitutes the frame of the heat exchanger; and a first metallic assembly and a second metallic assembly implemented so as to divide the auxiliary chamber, and divide the frame, into a first extremity compartment that communicates with the outside, a central compartment and a second extremity compartment, in which the central compartment communicates with the third and fourth openings so that the coolant fluid may flow from one to the other without coming into one of the extremity compartments and in which the first metallic element is implemented between the part of the assembly located in the first extremity compartment and at least part of the wall of the auxiliary chamber.

2. A heat exchanger according to claim 1, wherein the second metallic element is also implemented between the hot part of the assembly located in the second extremity compartment and the wall of the auxiliary chamber or frame.

3. A heat exchanger according to claim 1, wherein at least part of the first metallic element is located above the third opening of the chamber.

4. A heat exchanger according to claim 1, wherein at least part of the second metallic element is located above the fourth opening of the auxiliary chamber, such that the second metallic element is entirely kept cold by conduction in the same manner as the first metallic element by the third opening so as to enable a good thermal separation between the hot part of the heat exchanger on the exit side and the chamber which forms the frame.

5. A heat exchanger according to claim 1, wherein the chamber has a cylindrical shape, the heat exchanger is cylindrical and constitutes a first funnel and second funnel between which an array of pipes extends, the two metallic elements take the form of a cylindrical bell constituting of two rings implemented side by side, having a different radius from one another and linked to one another by a rim or lip and the part of the bell with the smallest radius is located underneath the third opening whereas the ring with the largest radius adjusts tightly to the cylindrically-circular wall of the auxiliary chamber.

6. A heat exchanger according to claim 1, wherein a waterproof seal, notably a circular seal in the case of a cylindrical heat exchanger, is implemented between the first metallic element and the wall.

7. A heat exchanger according to claim 1, wherein a waterproof seal is also implemented between the second metallic element and the wall of the chamber which forms the frame.

8. A heat exchanger according to claim 1, wherein the exit of the hot part of the heat exchanger constitutes of a bent pipe, the distal extremity of which coincides with the second opening of the chamber which forms the frame.

9. A heat exchanger according to claim 5, wherein the distance between the part of the bell to the opening is adjusted according the working characteristics of the heat exchanger.

10. An element of the air intake circuit of an internal combustion engine, in the form of an intake splitter, including a hollow body, at least part of said body is in a plastics material and which defines an intake chamber with an entry for air and one, or more exits which communicate with the head of the engine, wherein the hollow body includes a wall, at least part of which is in a plastics material, and said wall defines the chamber that forms the frame of a heat exchanger according to claim 1.

11. An element of the air intake circuit according to claim 10, wherein at least part of the wall is in a plastics material and the remaining part of the wall is metallic.

12. An element of the air intake circuit according to claim 10, wherein a locking mechanism is implemented, notably by latching, to fixate the assembly to the air intake circuit, notably to the intake splitter, in its working position within the auxiliary chamber.

* * * * *